United States Patent
Marchal et al.

(10) Patent No.: US 9,551,094 B2
(45) Date of Patent: Jan. 24, 2017

(54) FIBER PREFORM OF π-SHAPED SECTION, IN PARTICULAR FOR A FAN PLATFORM MADE OF COMPOSITE MATERIAL

(71) Applicant: SNECMA, Paris (FR)

(72) Inventors: Yann Marchal, Portsmouth, NH (US); Dominique Coupe, Medford, MA (US); Monica Fruscello, Amesbury, MD (US); Jonathan Goering, York, ME (US)

(73) Assignee: SNECMA, Paris (FR)

( * ) Notice: Subject to any disclaimer, the term of this patent is extended or adjusted under 35 U.S.C. 154(b) by 299 days.

(21) Appl. No.: 14/365,215

(22) PCT Filed: Dec. 10, 2012

(86) PCT No.: PCT/FR2012/052854
§ 371 (c)(1),
(2) Date: Jun. 13, 2014

(87) PCT Pub. No.: WO2013/088041
PCT Pub. Date: Jun. 20, 2013

(65) Prior Publication Data
US 2014/0322485 A1 Oct. 30, 2014

Related U.S. Application Data

(60) Provisional application No. 61/570,427, filed on Dec. 14, 2011.

(51) Int. Cl.
*D03D 25/00* (2006.01)
*B29C 70/24* (2006.01)
(Continued)

(52) U.S. Cl.
CPC ............. *D03D 25/005* (2013.01); *B29B 11/16* (2013.01); *B29C 70/222* (2013.01); *B29C 70/24* (2013.01); *Y10T 428/24174* (2015.01)

(58) Field of Classification Search
None
See application file for complete search history.

(56) References Cited

U.S. PATENT DOCUMENTS

| | | | |
|---|---|---|---|
| 6,446,675 B1 * | 9/2002 | Goering | D03D 25/005 139/11 |
| 6,676,882 B2 * | 1/2004 | Benson | B29B 15/122 156/286 |

(Continued)

OTHER PUBLICATIONS

International Search Report Issued Nov. 20, 2013 in PCT/FR12/052854 filed Dec. 10, 2012.

*Primary Examiner* — David Sample
*Assistant Examiner* — Donald M Flores, Jr.
(74) *Attorney, Agent, or Firm* — Oblon, McClelland, Maier & Neustadt, L.L.P.

(57) ABSTRACT

A fiber preform of π-shaped section, the preform including a base with a first face and an opposite second face, legs extending from the second face, and a fiber structure woven as a single piece by three-dimensional weaving with a plurality of layers of warp or weft yarns linked interlinked by weft or warp yarns in a plurality of layers of weft or warp yarns. In each plane of the preform, the weft or warp yarns of a first group of weft or warp yarns extend continuously through the base between two opposite edges thereof, and weft or warp yarns of a second group of weft or warp yarns extend continuously from an end of one of the legs to an end of the other leg, passing via the base, with the yarns of the first group and the yarns of the second group presenting two mutual crossings.

11 Claims, 3 Drawing Sheets

(51) Int. Cl.
*B29B 11/16* (2006.01)
*B29C 70/22* (2006.01)

(56) References Cited

U.S. PATENT DOCUMENTS

| | | | | |
|---|---|---|---|---|
| 6,712,099 B2* | 3/2004 | Schmidt | ............... | B29C 70/24 139/383 R |
| 6,835,261 B2* | 12/2004 | Schmidt | ............ | B29C 65/5071 156/304.5 |
| 6,874,543 B2* | 4/2005 | Schmidt | ............... | B29C 70/24 139/383 R |
| 7,014,805 B1* | 3/2006 | Reis | ............ | B29B 11/16 264/138 |
| 7,045,084 B1* | 5/2006 | Reis | ............ | B29B 11/16 264/138 |
| 7,712,488 B2* | 5/2010 | Goering | ............. | B29C 70/222 139/11 |
| 2010/0105268 A1* | 4/2010 | Ouellette | ............. | B29B 11/16 442/203 |
| 2010/0105269 A1* | 4/2010 | Goering | ............... | B29C 70/24 442/205 |

* cited by examiner

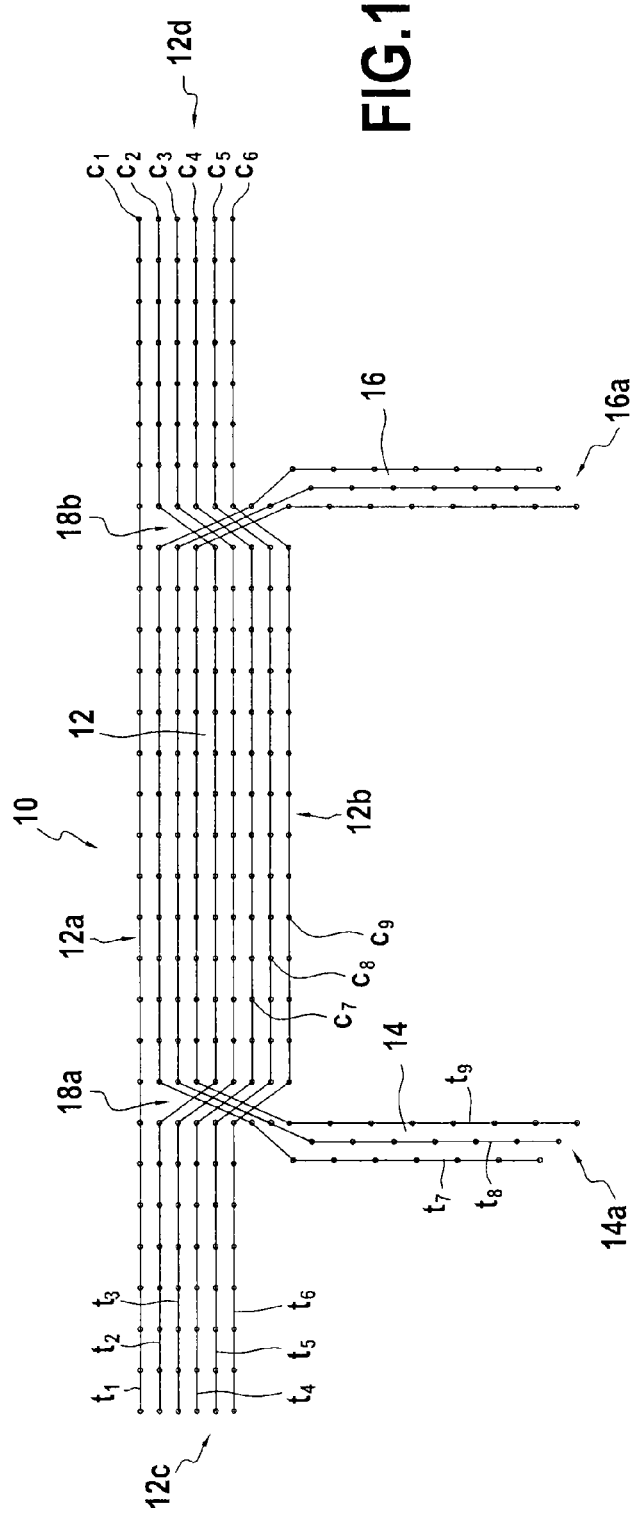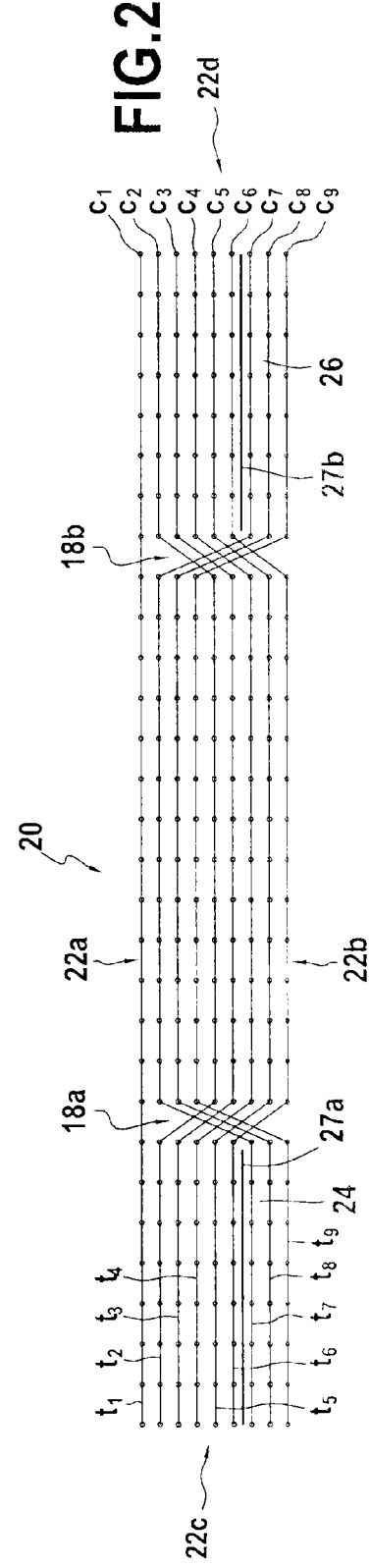

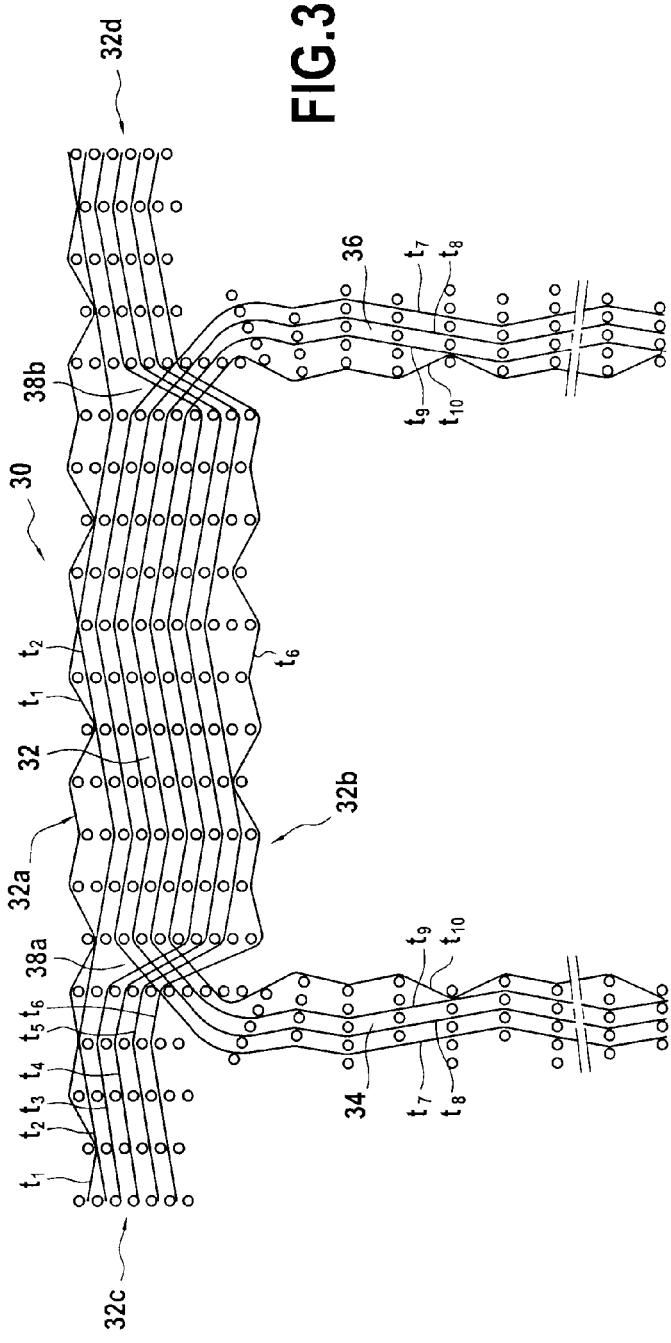
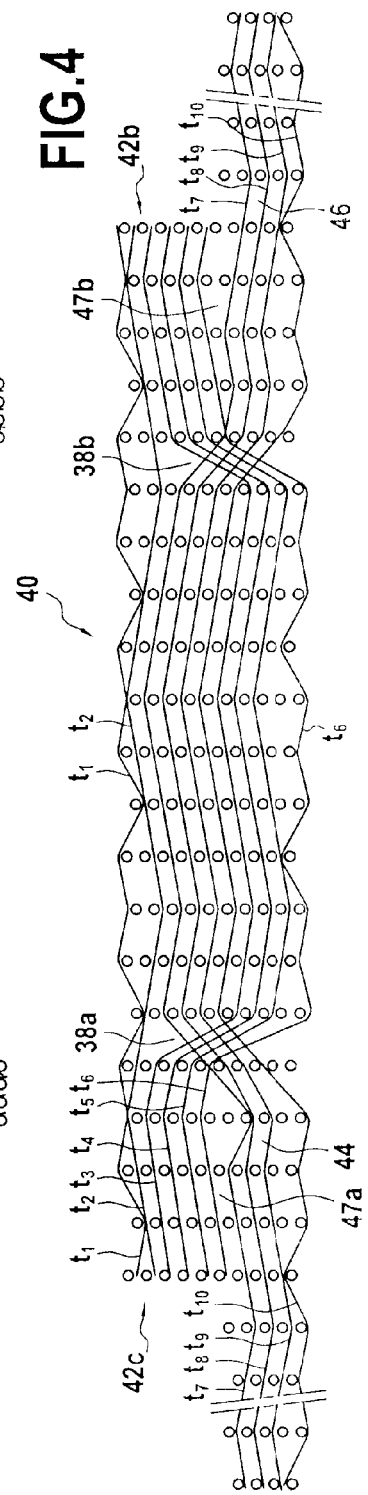

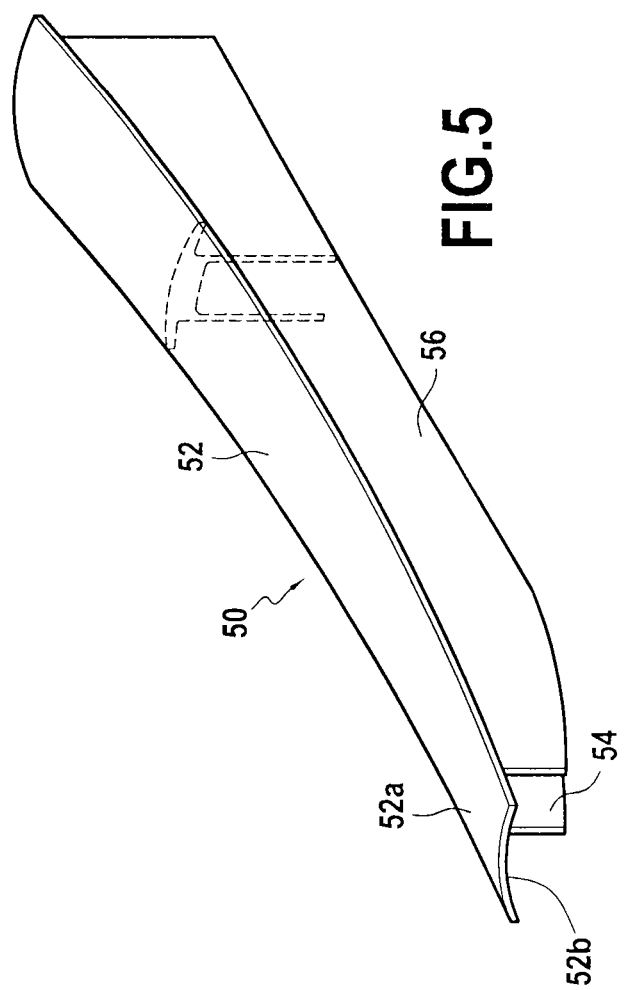

FIBER PREFORM OF π-SHAPED SECTION, IN PARTICULAR FOR A FAN PLATFORM MADE OF COMPOSITE MATERIAL

BACKGROUND OF THE INVENTION

The invention relates to making a fiber preform having a π-shaped section, in particular for fabricating a composite material platform for a fan blade in an aviation turbine engine.

In well-known mariner, a composite material part may be obtained by making a fiber preform and by densifying the fiber with a matrix. Depending on the intended application, the preform may be made of glass, carbon, or ceramic fibers, and the matrix may be made of an organic material (polymer), of carbon, or of ceramic.

For parts that are relatively complex in shape, it is known to make a fiber structure or blank as a single piece by three-dimensional (3D) or multiple-layer weaving, and to shape the fiber structure in order to obtain a fiber preform that presents a shape close to the shape of the part that is to be fabricated.

In order to facilitate such shaping, and in order to avoid making incisions that result in fibers being cut and that lead to a reduction in mechanical strength, it is known to leave one or more non-interlinked zones within the fiber structure while it is being woven. Such non-interlinked zones may be obtained by locally omitting any interlinking of the layers of adjacent yarns, thereby making it possible to fold out portions of the fiber structure adjacent to the non-interlinked zones.

Thus, when making a fiber preform having a section that is π-shaped, comprising a base and two legs extending from one of the faces of the base, the legs may be obtained by folding out portions that are adjacent to the non-interlinked zones in a 3D woven fiber structure.

OBJECT AND SUMMARY OF THE INVENTION

An object of the invention is to provide a fiber preform having a π-shaped section that presents good mechanical strength, in particular at the connection between the base and the legs.

According to an aspect of the invention, this object is achieved by a fiber preform of π-shaped section, the preform having a base with a first face and an opposite second face, and legs extending from the second face, the preform comprising a fiber structure woven as a single piece by three-dimensional weaving with a plurality of layers of warp yarns interlinked by weft yarns in a plurality of layers of weft yarns;

in which preform, in each weft plane of the fiber preform, the weft yarns of a first group of weft yarns extend continuously through the base between two opposite edges thereof, and weft yarns of a second group of weft yarns extend continuously from an end of one of the legs to an end of the other leg, passing via the base, with the weft yarns of the first group and the weft yarns of the second group presenting two mutual crossings.

The term "weft plane" of the fiber preform is used to mean a plane perpendicular to the warp yarns containing a column of weft yarns.

The term "group" of weft yarns is used to mean a set comprising one or more weft yarns.

Preferably, every weft yarn of the second group of weft yarns passes in depth via the base in order to improve the anchorage of the legs on the base.

Preferably, the crossings between the weft yarns of the first group and the weft yarns of the second group are situated close to the connections between the legs and the base, thereby providing reinforcement at these connections.

Advantageously, in each weft plane of the fiber preform, at least one weft yarn extends continuously from one edge to the other of the base, while remaining adjacent to the first face.

Also advantageously, in each weft plane of the fiber preform, at least one weft yarn extends continuously between the legs, while remaining adjacent to the second face.

Such continuity of weft yarns at the surface contributes to conferring a relatively smooth surface state to the composite material part that is obtained after densifying the fiber preform with a matrix.

In another aspect of the invention, the invention provides a fiber preform as defined above but with the terms "warp" and "weft" being interchanged.

According to yet another aspect, the invention provides a platform for a fan blade comprising a fiber preform of π-shaped section as defined above that is densified by a matrix.

BRIEF DESCRIPTION OF THE DRAWINGS

The invention can be better understood on reading the following description given by way of non-limiting indication and with reference to the accompanying drawings, in which:

FIG. 1 is a highly diagrammatic view of a weft plane of a fiber preform of π-shaped section;

FIG. 2 is a highly diagrammatic view of a weft plane of a 3D woven fiber structure making it possible, after being shaped, to obtain a preform such as that of FIG. 1;

FIG. 3 is a diagrammatic view of a plane of a fiber preform for a fan platform of an aviation turbine engine;

FIG. 4 is a diagrammatic view of a plane of a fiber structure making it possible, after shaping, to obtain the preform of FIG. 3; and FIG. 5 is a diagrammatic view of a fan blade platform obtained by densifying a preform similar to that of FIG. 3.

DETAILED DESCRIPTION OF EMBODIMENTS

In order to avoid overcrowding the drawings, the paths of weft yarns in the weft planes of FIGS. 1 and 2 are shown as successive straight line segments between columns of warp yarns, whereas the warp yarns, shown in section, are represented by dots. Since 3D weaving is involved, it will be understood that the weft yarns follow paths that are sinuous. The weft yarns interlink warp yarns belonging to different warp yarn layers, with the exception of any weft yarns that may be added to the surface in order to perform 2D weaving and with the exception of local non-interlinked zones between adjacent layers of weft yarns. Various 3D or multiple-layer weaves may be used, such as interlock, multiple-satin, or multiple-plain weaves, for example, as described in document WO 2006/136755.

FIG. 1 is a highly diagrammatic view of a weft plane of a fiber preform 10 having a base 12 and two legs 14 and 16, the preform 10 having a section that is π-shaped. The base 12 has two opposite faces 12a and 12b respectively on the outside and the inside, with the legs 14 and 16 extending from the inside face 12b. The warp yarns in the base 12 are woven in particular with weft yarns $t_1$, $t_2$, $t_3$, $t_4$, $t_5$, $t_6$ that extend continuously through the base 12 between opposite edges 12c and 12d.

The warp yarns in the legs 14 and 16 are woven with weft yarns $t_7$, $t_8$, $t_9$ that extend continuously from the end 14a of the leg 14 to the end 16a of the leg 16, passing via the base 12.

In each weft plane, the weft yarn $t_1$ extends continuously along the outside face 12a of the base 12. It may be woven with warp yarns of the warp yarn layer $c_1$ adjacent to the face 12a using a 2D weave so as to contribute, after the preform 10 has been densified with a matrix, to conferring a relatively smooth surface state to the outside surface of the resulting composite material part. In a variant, the weft yarn $t_1$ could be woven with warp yarns of a plurality of warp yarn layers using a 3D weave.

The yarns of the group comprising the weft yarns $t_2$, $t_3$, $t_4$, $t_5$, and $t_6$ and the yarns of the group of weft yarns $t_7$, $t_8$, and $t_9$ cross over one another twice along their paths through the base 12, with the two crossing zones 18a and 18b advantageously being situated at the connections between the base 12 and the legs 14 and 16.

In the side portions of the base 12 that extend between the edges 12c, 12d and the crossing zones 18a, 18b, and in each weft plane, warp yarns of different layers of warp yarns $c_1$ to $c_6$ are interlinked by the weft yarns $t_2$ to $t_6$ and possibly also $t_1$. In the middle portion of the base 12 between the crossings zones 18a and 18b, and in each weft plane, warp yarns of different layers of warp yarns $c_1$ to $c_9$ are interlinked by the weft yarns $t_7$ to $t_9$ and $t_2$ to $t_6$, and possibly also $t_1$, the middle portion of the base 12 including additional layers of warp yarns $c_7$ to $c_9$ compared with the side portions.

It should be observed that the weft yarn $t_6$ extends continuously along the inside face 12b of the base 12. As for the yarn $t_1$, in each weft plane, it is possible for the weaving of the weft yarn $t_6$ with the warp yarns of the layers $c_6$ in the side portions of the base 12 and $c_9$ in the middle portion of the base 12 to be performed using a 2D weave, the yarn $t_6$ then not being involved in 3D weaving.

In a variant, the weft yarn $t_6$ may be woven with warp yarns of a plurality of layers of warp yarns, using a 3D weave.

It should also be observed that the surface weaves, i.e. the weaves along the outside and inside faces 12a and 12b may be different from the weaves used within the core of the preform, e.g. a satin-type weave at the surface and an interlock type weave in the core.

The two crossings between the group of yarns $t_2$ to $t_6$ and the group of yarns $t_7$ to $t_9$ serve firstly to obtain reinforcement in the corners formed between the base 12 and the legs 14, 16, and secondly to obtain more secure anchoring of the legs 14, 16 to the base 12. Continuity of yarns is also ensured between the legs 14 and 16.

FIG. 2 shows a woven fiber structure 20 obtained by 3D weaving, from which the preform 10 of FIG. 1 can be obtained.

Between its outside and inside faces 22a and 22b, the fiber structure 20 has nine layers of warp yarns $c_1$ to $c_9$, and nine layers of weft yarns $t_1$ to $t_9$ with two crossings between the yarns of the group of weft yarns $t_2$ and $t_6$ and the yarns of the group of weft yarns $t_7$ to $t_9$ in the crossing zones 18a and 18b.

Non-interlinked zones 27a and 27b represented by bold lines in FIG. 2 are left between adjacent layers of warp yarns, specifically between the layers $c_6$ and $c_7$, these non-interlinked zones extending in the side portions of the fiber structure 20 between the opposite edges 20c and 20d thereof and the crossing zones 18a and 18b. These non-interlinked zones are the result of there being no weft yarns that pass through them in order to interlink warp yarns situated on either side of the non-interlinked zones.

After the fiber structure 20 has been woven, the portions 24 and 26 of the fiber structure 20 that are adjacent to the non-interlinked 27a and 27b and to the inside face 22b are deployed so as to form the legs 14 and 16 of the preform 10, with the remainder of the fiber structure forming the base 12.

It should be observed that warp yarns may be added or removed from the layers $c_7$, $c_8$, and $c_9$ at the ends of the portions 24 and 26 so that once these portions have been deployed, legs 14 and 16 are obtained that present lengths that are longer than or shorter than the dimensions in the weft direction of the side portions of the base 12.

Naturally, the numbers of layers of warp yarns and of weft yarns in the various portions of the preform (base and legs) may be different from those in the example shown, providing 3D weaving is implemented in each of said portions.

Furthermore, the number of yarns in the groups of yarns that cross twice may also be different from the numbers in the example shown providing there is at least one yarn in each group. In particular, there is no need for all of the wefts yarns involved in the weaving of the legs of the preform to be involved in two crossings with weft yarns that are involved in weaving the base.

The fibers of the fiber preform 10 are made of a material selected as a function of the intended application, e.g. out of glass, carbon, or ceramic.

In order to obtain a composite material part, the fiber preform 10 is densified with a matrix by holding the preform in shaping tooling at least until the preform has been stiffened (or consolidated). The matrix is of a nature that is selected as a function of the intended application, e.g. an organic matrix obtained in particular from a resin that is a precursor of a polymer matrix, such as an epoxy, bismaleimide, or polyimide resin, or a carbon matrix, or a ceramic matrix. When using an organic matrix, the fiber preform is impregnated with a composition containing the matrix precursor resin, prior to being shaped in tooling, or after shaping, with impregnation then being performed for example by infusion or by a resin transfer molding (RTM) type process. When the matrix is made of carbon or of ceramic, densification may be performed by chemical vapor infiltration (CVI) or by impregnation with a liquid composition that contains a carbon or ceramic precursor resin, followed by heat treatment to pyrolyze or ceramize the precursor, which methods are themselves well known.

FIG. 3 is a weft plan view of a fiber preform 30 for making a fan platform of an aviation turbine engine.

The fiber preform 30 has a π-shaped section similar to that of the preform 10 of FIG. 1 with a base 32 and two legs 34 and 36 that extend from the inside face 32b of the base 32.

The warp yarns of the legs 34 and 36 are woven with weft yarns $t_7$ to $t_{10}$ that extend continuously from one leg to the other, passing via the middle portion of the base 32. The weft yarns of the side portions of the base 32 are woven with weft yarns $t_1$ to $t_6$ that extend continuously between the opposite edges 32c and 32d of the base 32. The yarns of the group of weft yarns $t_7$ to $t_{10}$ and the yarns of the group of weft yarns $t_3$ to $t_6$ cross one another twice on their paths through the base 32, the two crossing zones 38a and 38b advantageously being situated at the connections between the base 32 and the legs 34 and 36.

In each weft plane, the yarns $t_1$ and $t_2$ extend along the outside face 32a of the base 32 without crossing the yarns $t_7$ to $t_{10}$.

The weave is of the interlock type with a satin weave at the surface, the weaving with the weft yarns $t_1$ and $t_6$ in the portions adjacent to the outside face 32a and to the inside face 32b being of the satin type. A satin type weave may also be adopted along the faces of the legs 34 and 36. 3D weaving of a fiber structure with an interlock type weave in its core and a satin type 2D or 3D weave at its skin is itself known. Reference may be made to document US 2010/0144227.

In a variant, it is possible to adopt a purely interlock weave or a plain or serge type weave at the surface instead of a satin type weave.

FIG. 4 shows a fiber structure 40 woven by 3D weaving and from which the preform 30 of FIG. 3 can be obtained.

It should be observed that the warp yarns of the various warp columns are represented in FIGS. 3 and 4 as having a staggered configuration.

The fiber structure 40 is similar to the fiber structure 20 of FIG. 2. There can be seen in the fiber structure 40 the crossing zones 38a and 38b between the yarns of the group of weft yarns $t_7$ to $t_{10}$ and the yarns of the group of weft yarns $t_3$ to $t_6$. Non-interlinked zones 47a and 47b are left between adjacent layers of warp yarns, these non-interlinked zones extending in the side portions of the fiber structure 40 between the opposite edges 40c and 40d thereof and the crossing zones 38a and 38b.

After weaving, the portions 44 and 46 of the fiber structure 40 that are adjacent to the non-interlinked zones 47a and 47b and to the inside face 42b of the fiber structure 40 are deployed in order to form the legs 34 and 36 of the preform 30, with the remainder of the fiber structure 40 forming the base 32.

It should be observed that the portions 44 and 46 extend beyond the edges 42c and 42d of the portion of the fiber structure 40 that corresponds to the edges 32c and 32d of the base 32 in the preform 30 of FIG. 3, as a result of adding columns of warp yarns in order to impart the desired length to the legs 34 and 36.

FIG. 5 shows a fan platform 50 of an aviation turbine engine of the kind that can be obtained by densifying a fiber preform similar to the preform 30 of FIG. 3, the fibers preferably being carbon fibers and the matrix preferably being a polymer matrix.

The platform 50 comprises a base 52 having a top face 52a and a bottom face 52b, and two legs 54 and 56 that serve in particular to form stiffening webs and that extend from the bottom face 52b, the platform 50 thus presenting a π-shaped section, as shown in dashed lines.

The platform 50 is designed to be mounted in the gap between two fan blades, in the vicinity of the blade roots, so as to define the inside of the annular air inlet passage into the fan, the passage being defined on the outside by a fan casing.

The platform 50 is machined to its final dimensions after the fiber preform has been densified.

In the embodiments described, the terms "warp" and "weft" could naturally be interchanged.

The invention claimed is:

1. A fiber preform of π-shaped section, the preform comprising:
    a base with a first face and an opposite second face;
    legs extending from the second face;
    a fiber structure woven as a single piece by three-dimensional weaving with a plurality of layers of warp yarns interlinked by weft yarns in a plurality of layers of weft yarns,
    wherein in each weft plane of the fiber preform, the weft yarns of a first group of weft yarns extend continuously through the base between two opposite edges thereof, and weft yarns of a second group of weft yarns extend continuously from an end of one of the legs to an end of the other leg, passing via the base, each yarn of the second group crossing a plurality of yarns of the first group in only two distinct mutual crossing zones, each mutual crossing zone being located between two adjacent columns of warp yarns.

2. A preform according to claim 1, wherein every weft yarn of the second group of weft yarns passes in depth via the base.

3. A preform according to claim 1, wherein the crossings between the weft yarns of the first group and the weft yarns of the second group are situated close to the connections between the legs and the base.

4. A preform according to claim 1, wherein, in each weft plane of the fiber preform, at least one weft yarn extends continuously from one edge to the other of the base, while remaining adjacent to the first face.

5. A preform according to claim 1, wherein, in each weft plane of the fiber preform, at least one weft yarn extends continuously between the legs, while remaining adjacent to the second face.

6. A platform for a fan blade, the platform being made of a composite material comprising a fiber preform according to claim 1 densified by a matrix.

7. A fiber preform of π-shaped section, the preform comprising:
    a base with a first face and an opposite second face;
    legs extending from the second face;
    a fiber structure woven as a single piece by three-dimensional weaving with a plurality of layers of weft yarns interlinked by warp yarns in a plurality of layers of warp yarns,
    wherein in each warp plane of the fiber preform, the warp yarns of a first group of warp yarns extend continuously through the base between two opposite edges thereof, and warp yarns of a second group of warp yarns extend continuously from an end of one of the legs to an end of the other leg, passing via the base, each yarn of the second group crossing a plurality of yarns of the first group in only two distinct mutual crossing zones, each mutual crossing zone being located between two adjacent columns of weft yarns.

8. A preform according to claim 7, wherein the crossings between the warp yarns of the first group and the warp yarns of the second group are situated close to the connections between the legs and the base.

9. A preform according to claim 7, wherein, in each warp plane of the fiber preform, at least one warp yarn extends continuously from one edge to the other of the base, while remaining adjacent to the first face.

10. A preform according to claim 7, wherein, in each warp plane of the fiber preform, at least one warp yarn extends continuously between the legs, while remaining adjacent to the second face.

11. A platform for a fan blade, the platform being made of a composite material comprising a fiber preform according to claim 7 densified by a matrix.

* * * * *